US012504377B2

(12) United States Patent
Tse et al.

(10) Patent No.: US 12,504,377 B2
(45) Date of Patent: Dec. 23, 2025

(54) HYPERSPECTRAL IMAGING APPARATUS

(71) Applicant: Hong Kong Applied Science And Technology Research Institute Co., Ltd., Hong Kong (CN)

(72) Inventors: Ming Leung Tse, Tuen Mun (HK); Ka Ki Woo, Tai Po (HK); Naixiang Wang, New Territories (HK); Chun Chung Chan, Kowloon (HK)

(73) Assignee: Hong Kong Applied Science And Technology Research Institute Co. Ltd, Shatin (HK)

( * ) Notice: Subject to any disclaimer, the term of this patent is extended or adjusted under 35 U.S.C. 154(b) by 177 days.

(21) Appl. No.: 18/600,980

(22) Filed: Mar. 11, 2024

(65) Prior Publication Data

US 2025/0283821 A1    Sep. 11, 2025

(51) Int. Cl.
*G01N 21/64* (2006.01)
*G02B 5/18* (2006.01)
(Continued)

(52) U.S. Cl.
CPC ....... *G01N 21/6456* (2013.01); *G02B 5/1861* (2013.01); *G02B 17/0832* (2013.01);
(Continued)

(58) Field of Classification Search
CPC ..... G01N 21/6456; G01N 2201/06113; G01N 2201/0634; G01N 2201/0636;
(Continued)

(56) References Cited

U.S. PATENT DOCUMENTS

| 9,927,364 B1 | 3/2018 | Chao et al. |
| 2010/0238440 A1 | 9/2010 | Oskotsky et al. |
| 2015/0022811 A1 | 1/2015 | Cornell et al. |

FOREIGN PATENT DOCUMENTS

| CN | 102183304 A | * | 9/2011 |
| CN | 106323471 A |   | 1/2017 |

(Continued)

OTHER PUBLICATIONS

English translation of CN102183304A1 (Year: 2011).*

(Continued)

*Primary Examiner* — Mark R Gaworecki
(74) *Attorney, Agent, or Firm* — GableGotwals

(57) ABSTRACT

A compact photoluminescence hyperspectral imaging apparatus comprises a fore-optics module and a spectrometer module. The fore-optics module has a line laser for line scanning a sample. The fore-optics module comprises optical components forming an emission light signal pathway to guide a line scan emission light signal from the sample into the spectrometer module. The spectrometer module comprises a plurality of optical components forming a folded optical light signal pathway between an emission light signal entrance and a deflection mirror. The plurality of optical components including a diffraction element and the deflection mirror are arranged in a single optical plane. The deflection mirror is arranged to deflect a diffracted light signal from the diffraction element out of the optical plane into a detector positioned above or below the optical plane.

20 Claims, 4 Drawing Sheets

(51) Int. Cl.
  *G02B 17/08*   (2006.01)
  *G02B 27/14*   (2006.01)
  *H04N 23/11*   (2023.01)
  *H04N 23/51*   (2023.01)

(52) U.S. Cl.
  CPC ........... *G02B 27/141* (2013.01); *H04N 23/11* (2023.01); *G01N 2201/06113* (2013.01); *G01N 2201/0634* (2013.01); *G01N 2201/0636* (2013.01); *G01N 2201/103* (2013.01); *H04N 23/51* (2023.01)

(58) Field of Classification Search
  CPC ............ G01N 2201/103; G02B 5/1861; G02B 17/0832; G02B 27/141; H04N 23/11; H04N 23/51
  See application file for complete search history.

(56) References Cited

FOREIGN PATENT DOCUMENTS

| | | |
|---|---|---|
| CN | 109297594 A | 2/2019 |
| CN | 113252169 A | 8/2021 |
| CN | 215640875 U | 1/2022 |
| DE | 102014217176 A1 | 3/2016 |
| JP | 5269879 B2 | 8/2013 |
| JP | 5632060 B1 | 11/2014 |

OTHER PUBLICATIONS

Faltynkova et al, "Hyperspectral imaging as an emerging tool to analyze microplatics: A systematic review and recommendations for future development", , Publisher: Microplastics and Nanoplastics 2021.

* cited by examiner

HYPERSPECTRAL IMAGING APPARATUS

FIELD OF THE INVENTION

The invention relates to a hyperspectral imaging apparatus and more particularly, but not exclusively, to a compact, photoluminescence hyperspectral imaging apparatus.

BACKGROUND OF THE INVENTION

A common configuration of a hyperspectral imaging apparatus and particularly of a spectrometer module for such an apparatus utilizes a linear light signal transmission configuration. This is illustrated by FIG. 1 which shows a typical linear light signal transmission configuration for a spectrometer module. The spectrometer module 10 of FIG. 1 has an entrance slit 12 for receiving an incoming light signal. The incoming light signal passes along an optical light signal pathway 14 between the entrance slit 12 and a detector or imaging sensor 16. The light signal pathway 14 is substantially a linear light signal transmission pathway. Within the light signal pathway 14 are a collimation lens 18, a transmission grating 20 and an imaging lens 22, which each function in a known manner.

Exemplar specification targets for the spectrometer module 10 comprise:
- spectral range: 400-1000 nm;
- spectral resolution: 1 nm;
- spatial range: 10 mm×10 mm; and
- spatial resolution: 10 um.

An exemplar structural specification for the spectrometer module 10 to achieve the specification targets comprises:
- transmission grating 20 having 200 lines/mm, with a distance d=5 um
- between slits, $\lambda$=wavelength and A=angle of diffraction;
- $\lambda 1$=400 nm=d*sin A1, A1=4.59°;
- $\lambda 2$=1000 nm=d*sin A2, A2=11.54°;
- width of imaging sensor 16=10 um*1000 pixels=10 mm;
- focal length (FL) of imaging lens 22 after grating 20 is FL2*(tan A2−tan A1)=10 mm, FL2=81 mm;
- Mag.=1; and
- FL of collimation lens 18 before grating 20 is FL1=FL2=81 mm.

This leads to the following physical dimensions of the spectrometer module 10:
- slit 12 to collimation lens 18=81 mm;
- thickness of collimation lens 18=10 mm;
- thickness of transmission grating 20=10 mm;
- thickness 1 imaging lens 22=10 mm;
- imaging lens 22 to imaging sensor 16=81 mm;
- thickness of imaging sensor 16=30 mm; and
- total linear length of the spectrometer module 10=222 mm.

The spectrometer module 10 of FIG. 1 and, by consequence, a hyperspectral imaging apparatus including said spectrometer module 10 exhibits many disadvantages. By way of example, one such disadvantage is the relatively long length of the linear optical light signal pathway 14 and consequently the length of the spectrometer module and the hyperspectral imaging apparatus. There are severe limits on how compact such an apparatus can be made given the relatively long length of the linear optical light signal pathway 14.

A further disadvantage is the need to use a transmission grating which has limited resolution, the resolution being limited by the number of lines (slits) per unit length.

Transmission gratings are very sensitive to alignment with other optical components having limited angular tolerance compared to reflection gratings. The alignment of the transmission grating with other optical components can be compromised by poor handling of the apparatus.

The transmission grating can experience thermal issues due to the absorption of energy from the light signal passing through it.

Therefore, it is desired to achieve, among other things, one or more of the following: (i) a compact spectrometer module and a compact hyperspectral imaging apparatus; (ii) utilization of a deflection grating in replacement of the transmission grating; and (iii) a wide field of view (FOV); (iv) a high signal-to-noise ratio (SNR); (v) fast scanning time; and (vi) photoluminescence sample detection.

Objects of the Invention

An object of the invention is to mitigate or obviate to some degree one or more problems associated with known spectrometer modules and hyperspectral imaging apparatuses.

The above object is met by the combination of features of the main claims; the sub-claims disclose further advantageous embodiments of the invention.

Another object of the invention is to provide a compact spectrometer module and a compact hyperspectral imaging apparatus.

Another object of the invention is to utilize a reflection grating in a spectrometer module for a compact hyperspectral imaging apparatus having a high SNR, a wide FOV, fast scanning time, and capable of photoluminescence sample detection.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a hyperspectral imaging apparatus comprising a fore-optics module and a spectrometer module. The fore-optics module has a line laser for line scanning a sample. The fore-optics module comprises optical components forming an emission light signal pathway to guide a line scan emission light signal from the sample into the spectrometer module. The spectrometer module comprises a plurality of optical components forming a folded optical light signal pathway between an emission light signal entrance and a deflection mirror. The plurality of optical components including a diffraction element and the deflection mirror are arranged in a single optical plane. The deflection mirror is arranged to deflect a diffracted light signal from the diffraction element out of the optical plane into a detector positioned above or below the optical plane.

The hyperspectral imaging apparatus is preferably a compact photoluminescence hyperspectral imaging apparatus for microscopic laser line-scanning of samples.

In a second main aspect, the invention provides a spectrometer module for a hyperspectral imaging apparatus. The spectrometer module comprises an emission light signal entrance for receiving a line laser scan emission light signal from a fore-optics module. A plurality of optical components form a folded optical path between the emission light signal entrance and a deflection mirror. The plurality of optical components including the deflection mirror and a diffraction element are arranged in an optical plane. The deflection mirror is arranged to deflect a diffracted light signal out of the optical plane into a detector positioned above or below the optical plane.

In a third main aspect, the invention provides a fore-optics module for a hyperspectral imaging apparatus. The fore-optics module comprises a line laser arranged to emit scanning line light along a scanning light signal pathway towards a sample holder. The sample holder is arranged to hold or support a sample. A dichroic filter is positioned in the scanning light signal pathway and arranged to allow the scanning line light to pass through it to the sample holder. The dichroic filter deflects a line scan emission light signal reflected from the sample out of the scanning light signal pathway onto an emission light signal pathway towards a spectrometer module such that the emission light signal travels over a portion of the scanning light signal pathway prior to being deflected by the dichroic filter.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
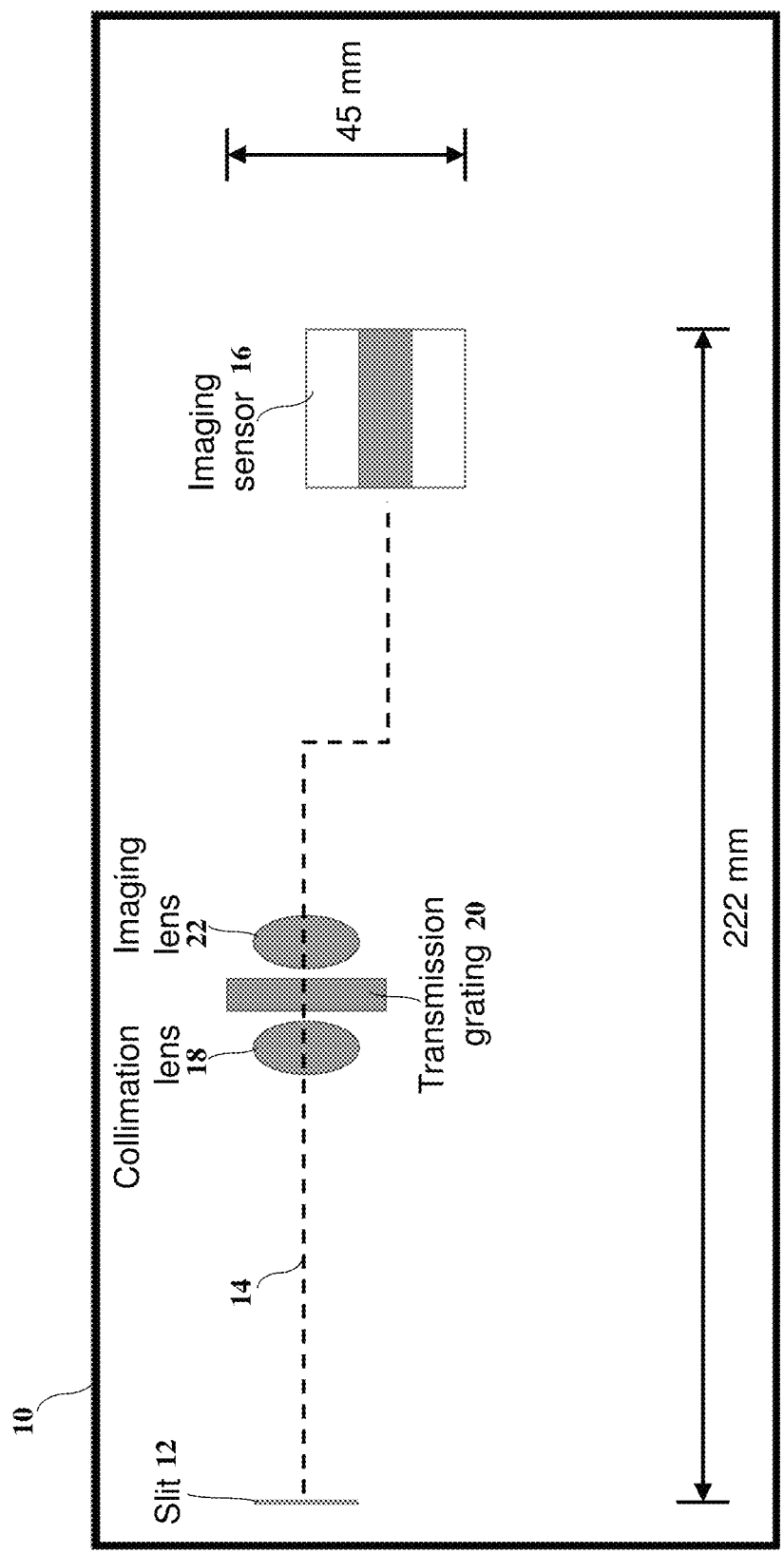
FIG. 1 is a schematic block diagram of a common configuration of a hyperspectral imaging apparatus and particularly of a spectrometer module for such an apparatus.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the drawings may be implemented in various forms of hardware, software, or combinations thereof. These elements may be implemented in a combination of hardware and software on one or more appropriately programmed general-purpose devices, which may include a processor, memory, and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 2:
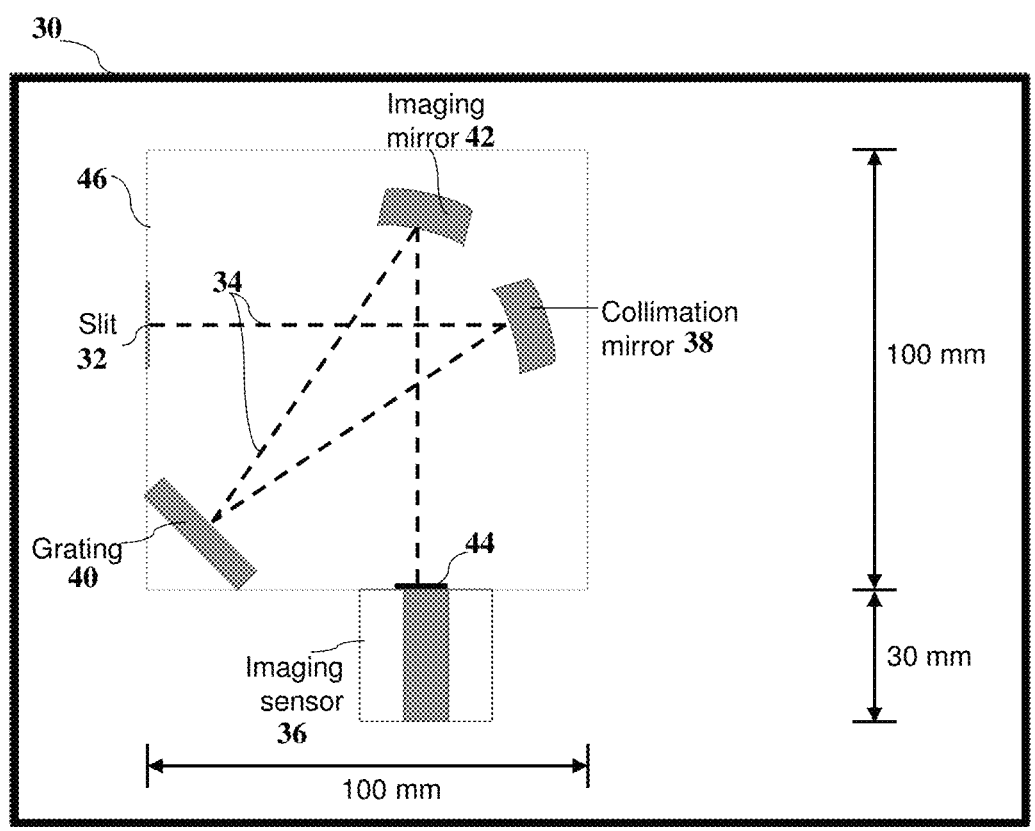
FIG. 2 is a schematic block diagram illustrating a light signal pathway configuration of a spectrometer module for a hyperspectral imaging apparatus consistent with the invention.

FIG. 2 provides a schematic block diagram illustrating a light signal pathway configuration of a spectrometer module 30 largely consistent with the invention. In this configuration of the spectrometer module 30, an incoming light signal is received at an entrance slit 32 and is guided along a folded optical light signal pathway 34 between the entrance slit 32 and an imaging sensor 36. Within the light signal pathway 34 are a reflective collimation lens 38, a reflective grating 40, a reflective imaging lens 42, and an exit slit 44. The optical components consisting of the reflective collimation lens 38, the reflective grating 40, and the reflective imaging lens 42 form the folded optical light signal pathway 34, i.e., that each portion of the light signal pathway 34 crosses at least one other portion of the light signal pathway 34. The configuration illustrated in FIG. 2 comprises a Czerny-Turner configuration of a spectrometer module.

The optical components consisting of the reflective collimation lens 38, the reflective grating 40, and the reflective imaging lens 42 form the folded optical light signal pathway 34 and, in addition to the entrance slit 32 and the exit slit 44, are all arranged in a same, single optical plane. Not consistent with the aims of the present invention, is the need in this configuration to position the imaging sensor 36 in the same, single optical plane, but positioned outside a space envelop enclosing the optical components 38, 40, 42, the entrance slit 32 and the exit slit 44; the space envelop delimited by square 46 in FIG. 2.

It can be seen that the configuration illustrated by FIG. 2 enables a reduction in the length of the spectrometer module 30 resulting in a more compact spectrometer module 30. However, it is possible to make the spectrometer module 30 even more compact.

Hyperspectral imaging collects and processes information from across the electromagnetic spectrum. Whereas the human eye sees color of visible light in mostly three bands (long wavelengths-perceived as red, medium wavelengths-perceived as green, and short wavelengths-perceived as blue), spectral imaging divides the spectrum into many more bands. In hyperspectral imaging, the recorded spectra have fine wavelength resolution and cover a wide range of wavelengths.

Hyperspectral sensors or detectors collect information as a set of 'images'. Each image represents a narrow wavelength range of the visible light spectrum, also known as a spectral band. These 'images' are combined to form a three-dimensional (x,y,λ) hyperspectral data cube for processing and analysis, where x and y represent two spatial dimensions of the imaged scene, and λ represents the spectral dimension comprising a narrow range of wavelengths. The precision of the detector is measured in spectral resolution, which is the width of each band of the spectrum that is captured. Where a large number of fairly narrow frequency bands is captured, it is possible to identify objects even if they are only captured in one pixel or a handful of pixels. If the pixels are too large, then multiple objects may be captured in the same pixel and become difficult to identify. If the pixels are too small, then the intensity captured by each sensor cell may be low, and the decreased signal-to-noise reduces the reliability of measured features. The acquisition and processing of hyperspectral images is also referred to as imaging spectroscopy or, with reference to the hyperspectral cube, as 3D spectroscopy.

Figure 3:
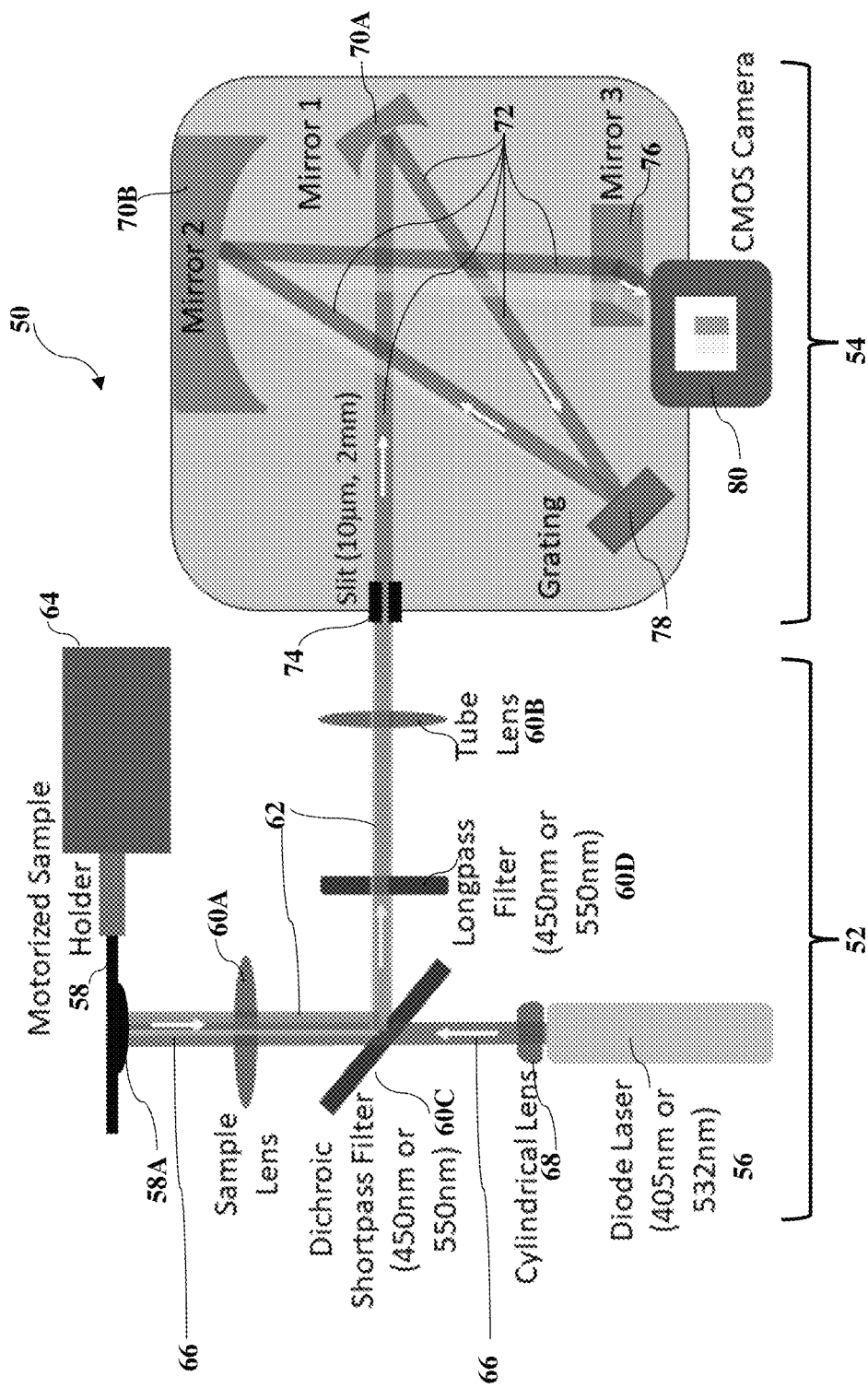
FIG. 3 is a schematic block diagram of an embodiment of a hyperspectral imaging apparatus in accordance with the invention.

Reference is made to FIG. 3 which comprises a schematic block diagram of an embodiment of a hyperspectral imaging apparatus 50 in accordance with the invention. The hyperspectral imaging apparatus 50 comprises a fore-optics module 52 and a spectrometer module 54.

The fore-optics module 52 comprises a line laser 56 for line scanning a sample 58A. The fore-optics module 52 comprises a number of optical components 60 forming an emission light signal pathway 62 which extends between the sample 58A and the spectrometer module 54. The sample 58A is held by or supported on a sample holder 58. The sample holder 58 is preferably a motorized sample holder. It may be movable by any suitable means such as, for example, a motor 64.

The optical components 60 forming the emission light signal pathway 62 guide a line scan emission light signal reflected from the sample 58A into the spectrometer module 54. The optical components 60 forming the emission light signal pathway 62 preferably comprise a sample lens 60A positioned near the sample holder 58, a tube lens 60B positioned near to spectrometer module 54, a dichroic filter 60C, which is preferably a short-pass filter, positioned between the sample lens 60A and the tube lens 60B, and a long-pass filter 60D between the dichroic short-pass filter 60C and the tube lens 60B.

The line laser 56 is arranged to emit scanning line light along a scanning light signal pathway 66 towards the sample holder 58 to thereby line scan the sample 58A placed or held on the sample holder 58. The motor 64 may move the sample holder 58 relative to the scanning light signal pathway 66 to enable the whole of the sample 58A to be line scanned by the line light emitted by the line laser 56. The motor 64 may comprise a linear translation motor 64. The sample holder 58 is mounted to the linear translation motor 64. The line laser 56 is used to screen the sample 58A which, in one embodiment, may contain microplastic particles. Microplastics are synthetic organic polymer particles in the size range of 0.001 mm to 5 mm. Owing to their small size, random distribution, and lack of biodegradability, microplastics are not removed by water treatment plants such as sewage treatment plants and typically end up in the waterways and oceans. The particles have a higher propensity to absorb toxic chemicals than other types of waste with the risk that the particles with their absorbed toxic chemicals pass into human and animal food chains. The sample 58A of microplastic particles has preferably been pre-processed by staining using a fluorescent dye. Preferably, the fluorescent dye comprises: a lipophilic dye, a hydrophobic dye, or a lipophilic and hydrophobic dye. One such dye comprises Nile Red which is a hydrophobic fluorescent dye having excellent solubility in nonpolar solvents and compatibility with hydrophobic environments. It exhibits strong fluorescence emission in the orange-red regions and can be used for lipid staining and tracking in plastic-based systems. Nile Red exhibits properties of a near-ideal lysochrome. It is strongly fluorescent, but only in the presence of a hydrophobic environment. Therefore, the dye is preferably first dissolved in one or more solvents prior to the sample of microplastic particles being stained. Suitable solvents comprise ethanol and acetone and the dye may be dissolved in a mixture of ethanol and acetone. The process of staining the sample of microplastic particles using the fluorescent dye is conducted for a predetermined incubation period. The incubation period could be a period lasting from 30 minutes to one hour, but it will be understood that the incubation period can be determined without undue experimentation.

The dichroic filter 60C is positioned in the scanning light signal pathway 66 but configured to allow the scanning line light from the line laser 56 to pass through it to reach the sample 58A on the sample holder 58. The position of the dichroic filter 60C in the scanning light signal pathway 66 is such that it deflects the line scan emission light signal reflected from the sample 58A out of the scanning light signal pathway 66 onto the emission light signal pathway 62 towards the spectrometer module 54 such that the emission light signal travels over a first portion of the scanning light signal pathway 66 prior to being deflected by the dichroic filter 60C. This co-path operation of the fore-optics module 52 enables the fore-optics module 52 to be made more compact. Furthermore, the dichroic filter 60C improves the SNR of the light signals.

The line laser 56 preferably comprises a diode laser and preferably operates in an ultraviolet (UV) to visible light signal range, and especially in the visible light signal range. When the line laser 56 is operating the visible light signal range, the excitation light emitted by the line laser 56 is within the visible light range and the reflected emission light from the dyed sample 58A is also within the visible light range. Consequently, it is possible to hyperspectrally image said emission light using a Silicon-based detector which can be obtained for a few US$ (dollars) compared to an InGaAs detector which can cost in the range of thousands of US$.

The diode laser 56 can be used to illuminate samples 58A at low cost as it is power-friendly and user-friendly.

The fore-optics module 52 may include a cylindrical lens 68 positioned in the scanning light signal pathway 66 close to the output of the line laser 56 to obtain an elongated light mode shape of the light emitted by the line laser 56. The cylindrical lens 68 improves even illumination of the sample 58A for a line of the target.

In the embodiment illustrated in FIG. 3, the line laser 56 operates at either 405 nm or 532 nm. The dichroic filter 60C and the long-pass filter 60D each operate at 450 nm or 550 nm.

The spectrometer module 54 comprises a plurality of optical components 70 forming a folded optical light signal pathway 72 between an emission light signal entrance 74 and a deflection mirror ("mirror 3") 76. The folded optical light signal pathway 72 preferably comprises a crossed Czerny-Turner configuration. The emission light signal entrance 74 preferably comprises an entrance slit. The entrance slit 74 preferably has a length or 'height' equal to or longer than 2 mm and preferably has a width of 10 micrometer. This is contrast to typical slit lengths of 1 mm or less, but the selection of the entrance slit 74 having a length of longer than 2 mm is for a much increased FOV. Furthermore, it has been found that it is necessary to increase the length of the entrance slit 74 to a length of at least 2 mm to enable practical microscopic line scanning of samples to be achieved. In this connection, the specification targets mentioned in connection with FIG. 1 should be considered as suitable specification targets for a microscopic, photoluminescent hyperspectral imaging apparatus 50 in accordance with the invention.

The plurality of optical components 70 may comprise the entrance slit 74, a reflective collimation lens ("mirror 1") 70A, the diffraction element or grating 78, a reflective imaging lens ("mirror") 70B, and the deflection mirror 76. The plurality of optical components 70 form the folded optical light signal pathway 72, i.e., that each portion of the light signal pathway 72 crosses at least one other portion of the light signal pathway 72. The plurality of optical components 70 are arranged in a same, single optical plane. The reflective collimation lens ("mirror 1") 70A collimates the emission light signal received at the entrance slit 74 and reflects a collimated light signal towards the diffraction element or grating 78. The reflective imaging lens ("mirror") 70B reflects a diffracted light signal from the diffraction element or grating 78 towards the deflection mirror 76.

The diffraction element or grating 78 preferably comprises a planar diffraction grating 78, and more preferably comprises a reflective planar diffraction grating 78. A reflective planar diffraction grating provides high spectral resolution. The deflection mirror 76 is arranged to deflect the diffracted light signal from the reflective planar diffraction grating 78 out of the optical plane to pass into a detector 80 positioned above or below the optical plane. The deflection mirror 76 preferably deflects the diffracted light signal perpendicularly out of the optical plane into the detector 80. Preferably, the detector 80 comprises a high definition digital camera 80. The camera 80 may comprise a complementary metal-oxide semiconductor (CMOS) camera 80. The CMOS camera 80 captures spatial and spectral information from samples 58A.

It will be noted that, in the novel configuration of FIG. 3, the spectrometer module 54 does not require a light signal exit slit leading to the CMOS camera 80. The CMOS camera 80 can be positioned above or below the single optical plane and within the space envelop or footprint defined by the plurality of optical components 70. As such, it is possible to make the spectrometer module 54 more compact and thus to make the hyperspectral imaging apparatus 50 more compact.

Figure 4:
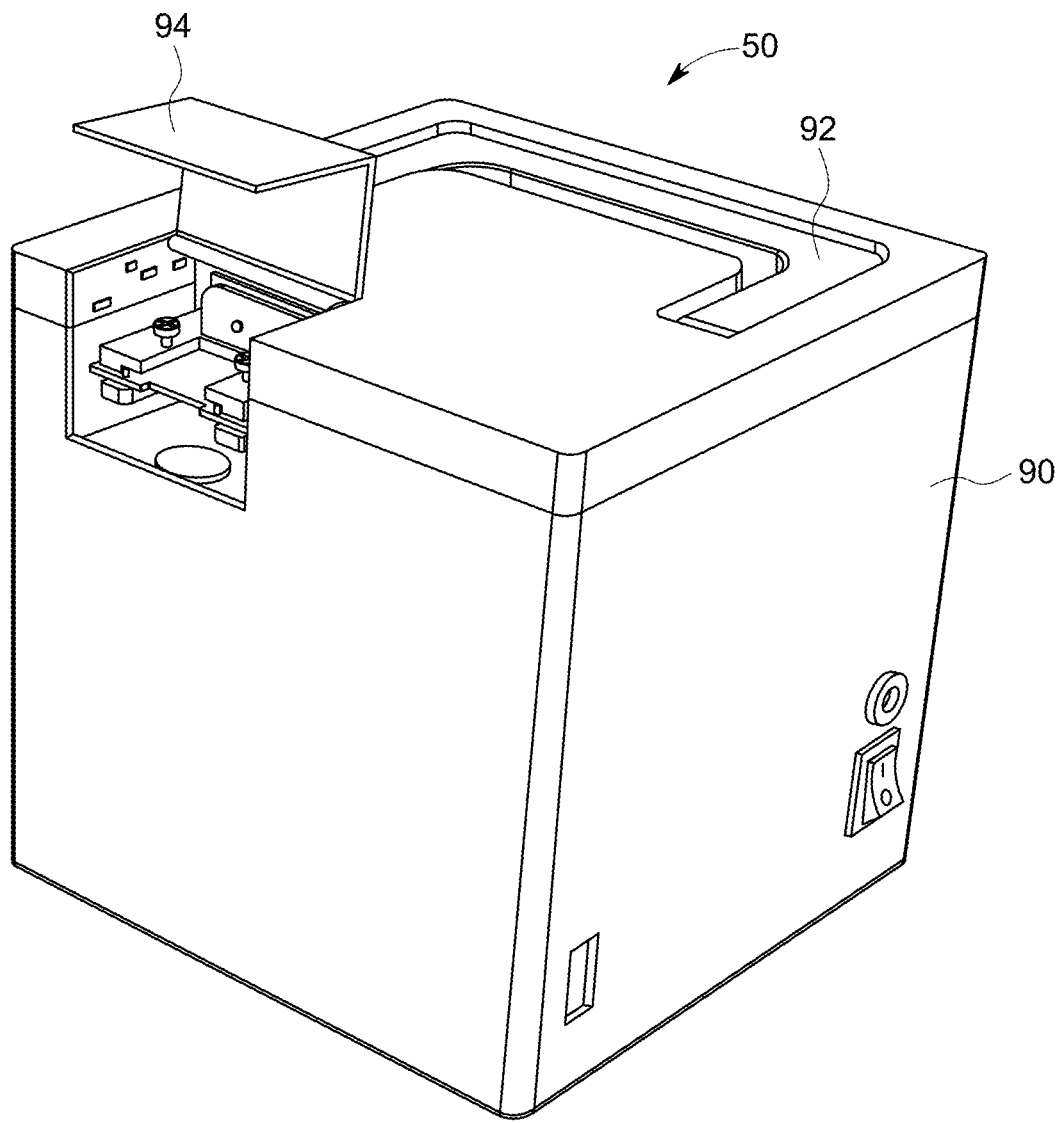
FIG. 4 is a perspective view of the hyperspectral imaging apparatus of FIG. 3.

Reference is made to FIG. 4 which provides a perspective view of the hyperspectral imaging apparatus 50. The hyperspectral imaging apparatus 50 preferably comprises a housing 90. The housing 90 contains the fore-optics module 52 and the spectrometer module 54. In addition, the housing 90 may contain any of a data acquisition system to control the CMOS camera 80 and to capture and convert light signals. The housing 90 may also contain a spectral calibration module to ensure accurate wavelength assignment for each pixel in hyperspectral images captured by the CMOS camera 80. The housing 90 may also contain a data processing and analysis module for implementing suitable computational techniques with associated software and/or algorithms. For example, the hyperspectral imaging apparatus 50 may implement one or more suitable algorithms to implement any of: (i) a fluorescent tagging process combined with line-scan visible range hyperspectral imaging for fast screening of microplastic particles at high spatial resolution and low cost; (ii) a solvatochromic and emission spectrum feature based microplastics classification algorithm for identification of different types of microplastics; and (iii) a dynamic range extension and SNR enhancement for microplastics detection in real samples. The housing 90 may also contain a display and visualization module to assist users in operating the apparatus 50 and to aid in interpretation and analysis of captured hyperspectral images of scanned samples 58A.

Preferably, the housing 90 or a part of the housing 90 containing the fore-optics module and the spectrometer module also contains a light absorbing material such as, for example, a black cloth to prevent or reduce ambient light reaching the CMOS camera 80 and/or any of the optical components of the fore-optics module 52, and/or any of the optical components of the spectrometer module 54.

The hyperspectral imaging apparatus 50 of FIG. 4 is small and portable having a handle 92 for easily transporting the apparatus 50 from one location to another.

It can also be seen that the apparatus 50 has a door 94, shown in its open position, which provides access to a user to load a sample 58A onto the sample holder 58.

The apparatus 50 may include a translation sample stage.

The housing 90 may have its shape defined by one or more linear dimensions, the longest of said linear dimension being 15 centimeters or less. The housing 90 preferably is cube shaped as shown in FIG. 4 with sides of 15 centimeters or less in length.

The various modules contained within the housing 90 of the apparatus 50 may be connectable to an external computer to control the line laser 56, the translation stage, and the detector 80.

The line laser 56 may operate at any one or more of ultraviolet, visible, or infrared wavelengths.

The line laser 56 may have an elongated mode shape, for example, ellipse or saucer shaped.

The translational sample holder 58 may have a travel distance of no less than 100 millimeters.

The detector 80 may comprise a camera, a charge-coupled device (CCD), a sensor, a photodiode, or a focal plane array.

The apparatus 50 may weigh 2.3 kilograms or less.

The invention relates to a portable, affordable, microscopic hyperspectral imaging device operating in line-scan mode.

The invention also provides a non-transitory computer-readable medium storing machine-readable instructions, wherein, when the machine-readable instructions are executed by a processor, they configure the apparatus 50 to implement the method of any one of the appended method claims.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A hyperspectral imaging apparatus comprising:
   a fore-optics module; and
   a spectrometer module;
   the fore-optics module having a line laser for line scanning a sample, the fore-optics module comprising optical components forming an emission light signal pathway to guide a line scan emission light signal from the sample into the spectrometer module; and
   the spectrometer module comprising a plurality of optical components forming a folded optical light signal pathway between an emission light signal entrance and a deflection mirror, the plurality of optical components including a diffraction element and the deflection mirror being arranged in an optical plane, the deflection mirror arranged to deflect a diffracted light signal from the diffraction element out of the optical plane into a detector positioned above or below the optical plane.

2. The apparatus of claim 1, wherein the plurality of optical components of the spectrometer module comprise a first mirror for collimating the emission light signal received at the emission light signal entrance and directing a collimated light signal to the light diffraction element, a second imaging mirror for directing the diffracted light signal from the diffraction element towards the deflection mirror, the first mirror, the diffraction element, the second mirror, and the deflection mirror arranged in said optical plane.

3. The apparatus of claim 2, wherein the plurality of optical components are arranged in a crossed Czerny-Turner configuration.

4. The apparatus of claim 1, wherein the diffraction element comprises a planar diffraction grating.

5. The apparatus of claim 4, wherein the planar diffraction grating comprises a reflective planar diffraction grating.

6. The apparatus of claim 1, wherein the deflection mirror is arranged to deflect the diffracted light signal perpendicularly out of the optical plane into the detector.

7. The apparatus of claim 1, wherein the detector is a digital camera.

8. The apparatus of claim 7, wherein the digital camera is a complementary metal-oxide semiconductor (CMOS) camera.

9. The apparatus of claim 1, wherein the entrance to the spectrometer module comprises an entrance slit having a length of equal to or longer than 2 mm.

10. The apparatus of claim 1, wherein the spectrometer module does not have a diffracted light signal exit slit.

11. The apparatus of claim 1, wherein the line laser is arranged to emit scanning line light along a scanning light signal pathway towards a sample holder of the fore-optics module, the sample holder arranged to hold or support a sample, a dichroic filter positioned in the scanning light signal pathway and arranged to allow the scanning line light to pass through it to the sample holder, the dichroic filter deflecting the line scan emission light signal reflected from the sample out of the scanning light signal pathway onto the emission light signal pathway towards the spectrometer module such that the emission light signal travels over a portion of the scanning light signal pathway prior to being deflected by the dichroic filter.

12. The apparatus of claim 11, wherein the dichroic filter comprises a short-pass filter.

13. The apparatus of claim 11, wherein the emission light signal pathway includes a long-pass filter.

14. The apparatus of claim 11, wherein the sample holder is motorized such that motorized movement of the sample holder enables the scanning line light of the laser to pass over the sample holder.

15. The apparatus of claim 11, wherein the fore-optics module includes a cylindrical lens positioned in the scanning light signal pathway to obtain an elongated light mode shape of the light emitted by the laser.

16. The apparatus of claim 1, wherein the laser comprises a diode laser.

17. The apparatus of claim 16, wherein the diode laser operates in a an ultraviolet (UV) to visible light signal range.

18. The apparatus of claim 1, wherein the apparatus comprises a housing containing the fore-optics module and the spectrometer module, the housing containing a black cloth to prevent or reduce ambient light reaching the detector and/or any of the optical components of the fore-optics module, and/or any of the optical components of the spectrometer module.

19. A spectrometer module for a hyperspectral imaging apparatus, the spectrometer module comprising:

an emission light signal entrance for receiving a line laser scan emission light signal from a fore-optics module; and a plurality of optical components forming a folded optical path between the emission light signal entrance and a deflection mirror, the plurality of optical components including the deflection mirror and a diffraction element being arranged in an optical plane, the deflection mirror arranged to deflect a diffracted light signal out of the optical plane into a detector positioned above or below the optical plane.

20. A fore-optics module for a hyperspectral imaging apparatus, the fore-optics module comprising:

a line laser arranged to emit scanning line light along a scanning light signal pathway towards a sample holder, the sample holder arranged to hold or support a sample; and a dichroic filter positioned in the scanning light signal pathway and arranged to allow the scanning line light to pass through it to the sample holder, the dichroic filter deflecting a line scan emission light signal reflected from the sample out of the scanning light signal pathway onto an emission light signal pathway towards a spectrometer module such that the emission light signal travels over a portion of the scanning light signal pathway prior to being deflected by the dichroic filter.

* * * * *